(12) United States Patent
Zito et al.

(10) Patent No.: US 10,002,195 B2
(45) Date of Patent: Jun. 19, 2018

(54) SYSTEM AND METHOD FOR PROVIDING TIME-BASED CONTENT

(71) Applicant: OATH INC., New York, NY (US)

(72) Inventors: David Zito, Pasadena, CA (US); Joseph Essas, Los Angeles, CA (US)

(73) Assignee: OATH INC., New York, NY (US)

( * ) Notice: Subject to any disclaimer, the term of this patent is extended or adjusted under 35 U.S.C. 154(b) by 0 days. days.

(21) Appl. No.: 14/151,343

(22) Filed: Jan. 9, 2014

(65) Prior Publication Data

US 2014/0130088 A1    May 8, 2014

Related U.S. Application Data

(63) Continuation of application No. 13/435,803, filed on Mar. 30, 2012, now Pat. No. 8,732,747, which is a (Continued)

(51) Int. Cl.
*G06F 17/30* (2006.01)
*H04H 60/65* (2008.01)
(Continued)

(52) U.S. Cl.
CPC .. *G06F 17/30867* (2013.01); *G06F 17/30035* (2013.01); *G06F 17/3053* (2013.01); *G06F 17/30828* (2013.01); *G06F 17/30864* (2013.01); *G06Q 30/0256* (2013.01); *H04H 60/65* (2013.01); *H04N 5/445* (2013.01); *H04N 7/17318* (2013.01); *H04N 7/17336* (2013.01); *H04N 21/25891* (2013.01); *H04N 21/2668* (2013.01); *H04N 21/42204* (2013.01); *H04N 21/42209* (2013.01); *H04N 21/44222* (2013.01);
(Continued)

(58) Field of Classification Search
USPC ..... 725/9–14, 23–29, 32–46, 50, 53, 60–61, 725/86, 135, 139, 143; 705/1, 26
See application file for complete search history.

(56) References Cited

U.S. PATENT DOCUMENTS 6,401,059 B1   6/2002   Shen et al.
6,493,688 B1   12/2002   Das et al.
(Continued)

FOREIGN PATENT DOCUMENTS

EP           1189437     3/2002
WO   WO 1999/052285   4/1999
WO   WO 2004/079592   9/2004

*Primary Examiner* — Nicholas T Corbo
(74) *Attorney, Agent, or Firm* — James J. DeCarlo; Greenberg Traurig, LLP

(57) ABSTRACT

System and method for providing time-based content. In one embodiment, time-based offers are presented to viewers of broadcast content, and may be presented on the same display device being used to display broadcast programming. In another embodiment, time-based offers are commercial offers inviting the viewer to purchase goods or services at a special rate for a limited time. Time-based offers may also be customized based on programming content being viewed and/or viewer profile data. Responses to presented time-based offers may be used to update viewer profile data and/or merchant conversion profile data, which is a measure of how effective the particular offer is.

20 Claims, 9 Drawing Sheets

Related U.S. Application Data continuation of application No. 11/104,326, filed on Apr. 11, 2005, now Pat. No. 8,250,599.

(60) Provisional application No. 60/622,469, filed on Oct. 26, 2004.

(51) Int. Cl.
| | | |
|---|---|---|
| *H04N 5/445* | (2011.01) | |
| *H04N 7/173* | (2011.01) | |
| *H04N 21/258* | (2011.01) | |
| *H04N 21/422* | (2011.01) | |
| *H04N 21/442* | (2011.01) | |
| *H04N 21/45* | (2011.01) | |
| *H04N 21/478* | (2011.01) | |
| *H04N 21/482* | (2011.01) | |
| *H04N 21/485* | (2011.01) | |
| *H04N 21/658* | (2011.01) | |
| *H04N 21/81* | (2011.01) | |
| *H04N 21/84* | (2011.01) | |
| *H04N 21/2668* | (2011.01) | |
| *H04N 21/488* | (2011.01) | |
| *G06Q 30/02* | (2012.01) | |
| *H04H 60/33* | (2008.01) | |
| *H04H 60/46* | (2008.01) | |

(52) U.S. Cl.
CPC ... *H04N 21/4532* (2013.01); *H04N 21/47815* (2013.01); *H04N 21/488* (2013.01); *H04N 21/4828* (2013.01); *H04N 21/4858* (2013.01); *H04N 21/6582* (2013.01); *H04N 21/812* (2013.01); *H04N 21/84* (2013.01); *H04H 60/33* (2013.01); *H04H 60/46* (2013.01)

(56) References Cited

U.S. PATENT DOCUMENTS

| | | | |
|---|---|---|---|
| 7,546,625 B1 * | 6/2009 | Kamangar | 725/93 |
| 8,028,314 B1 | 9/2011 | Sezan et al. | |
| 2002/0042923 A1 * | 4/2002 | Asmussen et al. | 725/92 |
| 2002/0046401 A1 * | 4/2002 | Miyazaki | H04N 7/17318 725/32 |
| 2002/0066097 A1 | 5/2002 | Hattori et al. | |
| 2002/0083043 A1 | 6/2002 | Hoshi et al. | |
| 2002/0092031 A1 * | 7/2002 | Dudkiewicz | G06F 17/30017 725/138 |
| 2002/0112250 A1 * | 8/2002 | Koplar et al. | 725/153 |
| 2003/0074661 A1 * | 4/2003 | Krapf | G06Q 30/02 725/34 |
| 2003/0237100 A1 * | 12/2003 | Piotrowski | 725/135 |
| 2004/0139025 A1 * | 7/2004 | Coleman | 705/51 |
| 2004/0210602 A1 * | 10/2004 | Hillis et al. | 707/104.1 |
| 2005/0138653 A1 * | 6/2005 | Littrell | 725/23 |

\* cited by examiner

SYSTEM AND METHOD FOR PROVIDING TIME-BASED CONTENT

CLAIM OF PRIORITY

This application is a continuation of and claims priority to U.S. patent application Ser. No. 13/435,803, filed on Mar. 30, 2012 which is a continuation of and claims the benefit of U.S. Pat. No. 8,250,599, filed Apr. 11, 2005, which claims priority to U.S. Provisional patent application Ser. No. 60/622,469, filed Oct. 26, 2004, each of which is hereby incorporated by reference in its entirety.

FIELD OF THE INVENTION

The present invention relates in general to a method and apparatus for a search-enabled remote control, and more particularly to providing a search-enabled remote control device which facilities viewers' ability to search through programming and/or other content options and view results.

BACKGROUND

Current interactive devices for controlling broadcast programming are limited to changing the content based upon explicit choices and do not provide any true personalization of the viewing experience based upon the behavior and interests of the individual viewers. Thus, there is a need for a universal device to increase personalization and real-time customization of the viewing experience.

One way to do this would be to tailor the viewing experience based on a viewer's habits and interests. However, heretofore there have been few ways in which a user has been able to personalize their television experience. Aside from being able to select a list of favorite channels or time-shift content, viewers are generally limited to viewing what is or has been broadcast to the general populous.

Current television remote controls are also not enabled to allow significant commercial transactions, especially those related to the content they are viewing. Most commercial activity enabled by current remotes is limited to transactions related to viewing content like purchasing pay-per-view (PPV) or upgrading subscription options. There is therefore also a need for a device for controlling multimedia viewing that facilitates commercial transactions related to real-time programming.

Another problem with the current television viewing experience is the ever increasing amount of available content. The amount of available content has increased substantially even over the last few years. Until now most viewers have literally hundreds of viewing choices at any one time. As the amount of content increases and additional programming options become available, it becomes even more difficult for viewers to locate and select not only particular viewing content of interest, but also multimedia information relating to the television content (e.g., related commercial) items.

Accordingly, there is a need in the art to facilitate and the customization of television viewing experience by personalizing, not only the ability to interactively search through viewing content choices, but also to provide the ability to search all online multimedia including facilities for conducting real-time transactions related to the programming being viewed.

BRIEF SUMMARY OF THE INVENTION

Disclosed and claimed herein are systems and methods for presenting time-based offers. In one embodiment, a method includes storing data representative of a plurality of possible offers on a remote server, selecting an offer from among the plurality of possible offers based on at least one of viewer profile data and current programming data. The method further includes transmitting the selected offer to a client-side device for display on a display device.

Other aspects, features, and techniques of the invention will be apparent to one skilled in the relevant art in view of the following detailed description of the invention.

DETAILED DESCRIPTION OF EXEMPLARY EMBODIMENTS

Figure 1A:
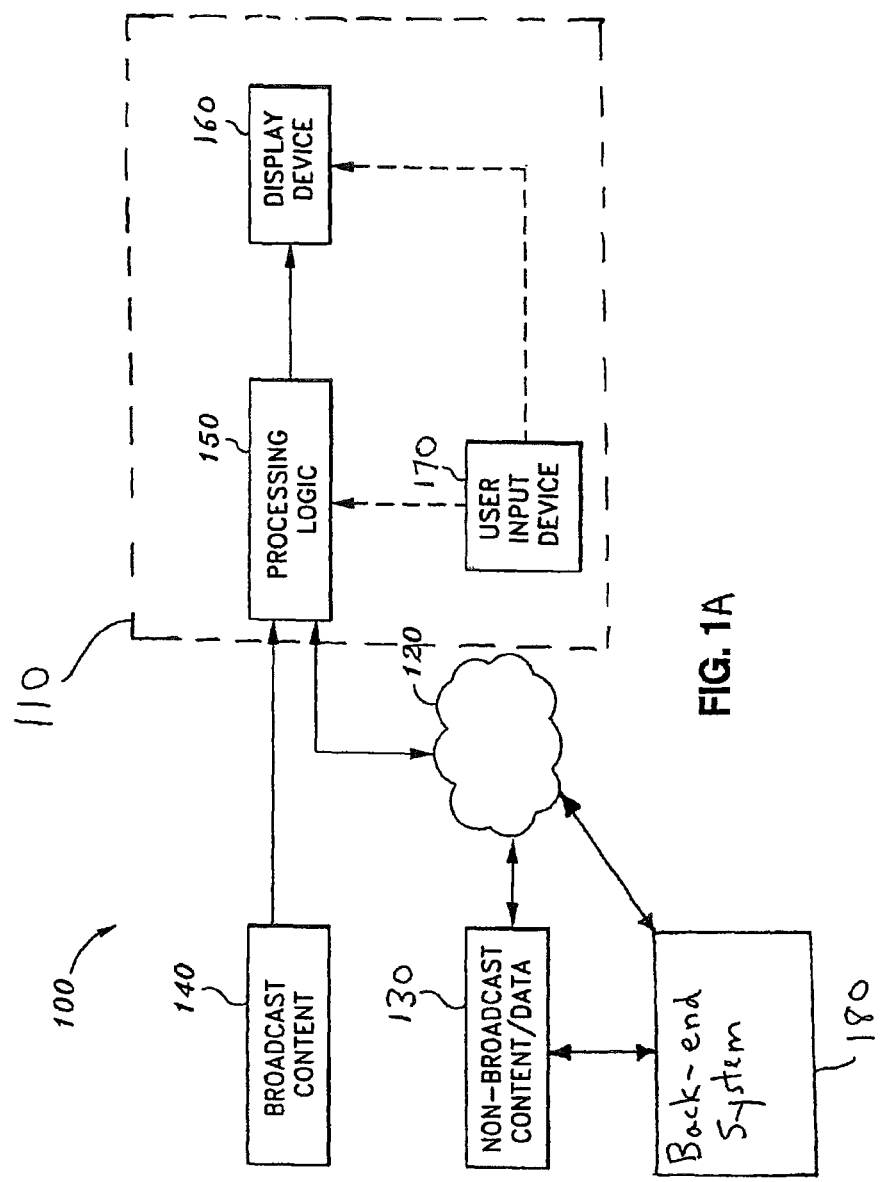
FIGS. 1A-1B depict embodiments of simplified system diagrams of one or more aspects of the invention.

One aspect of the invention is to provide a search-enabled remote control device which facilities viewers' ability to search through programming options and view results. In one embodiment, a viewer is able to use a traditional remote control interface (e.g., volume up, volume down, channel up, etc.) to navigate through menus or selections and to display search results on screen. In another embodiment, the remote control may include a keypad, thumb board or other input means for facilitating the search functionality. In yet another embodiment, the remote control may further include a display portion for displaying the results of viewers' searches. In another embodiment, or in addition to one or more of the previous embodiments, the remote control is able to communicate wirelessly with a back-end processing system via a remote network.

In another embodiment, a user may be permitted to set preferences (either online or using the search-enabled remote) for how online content may be integrated with programming content, either on a display device or on the search-enabled remote. This content mix may be dynamic in that it may be automatically optimized over time by refining it based on user interaction with the results and programming.

Another aspect of the invention is to track viewer watching behavior and/or searching habits. In one embodiment, the data obtained from tracking viewer activities may then be used to develop a viewer profile, which may in turn be used to target advertisements, information and/or future programming options. For example, the use of television watching habits may be used to inform a variety of advertisement marketplaces, including additional distribution mediums/networks. In addition, appropriate commercial items may be targeted to individual user based on such television viewing and/or searching habits.

Another aspect of the invention is to mix or prioritize search results based on one or more criteria. In one embodiment, search results may be mixed and/or prioritized based on user profile data, preferred advertiser/merchant rankings or a combination thereof. In another embodiment, search results may presented to a viewer on a display device simultaneously along with broadcast and/or streaming content. In another embodiment, the search results may be "pushed" to a client-side device and presented along with related broadcast content. Alternatively, the search results may be based on one or more user-provided search criteria.

Another aspect of the invention is to present time-based offers to viewers of broadcast content. In one embodiment, time-based offers may be presented to a user on the same display device being used to display broadcast programming. While in one embodiment, time-based offers may be commercial offers inviting the viewer to purchase goods or services at a special rate for a limited time, it should of course be understood that the offers may be of a non-commercial nature as well. Similarly, while the offers may be time-based (i.e., valid for a limited time only), in another embodiment the offers may not have an expiration. By way of providing a non-limiting example, such offers may invite a user to purchase goods or services at a discounted rate if a purchase is made within a specified time. Such offers may also be in form of receiving additional free goods and/or services if a purchase is made within the specified time.

In another embodiment, the time-based offers may be customized for a particular user based on their habits and/or interests. In this fashion, the previously mentioned viewer profiling may be used to select from among a plurality of potential offers. By tracking viewer watching behavior and/or searching habits, particular time-based offers may be presented to the viewer to maximize the likelihood of the user accepting the offer. In one embodiment, the data obtained from tracking the user's acceptance and/or rejection of presented offers may also be used to update the user's viewer profile, which may in turn be used to better target advertisements, information and/or future programming options.

In still another embodiment, time-based offers may be customized based on programming content being viewed. By way of example, broadcast content schedule information may be obtained from television programming guide data. Such broadcast content information may then be analyzed and assigned one or more keywords for matching to potential time-based offers. In addition, keyword assignment may also be done for portions of a program or particular scenes of a program.

User responses to presented time-based offers may in turn be used to update viewer profile data and/or merchant conversion profiles. In one embodiment, a merchant's conversion profile is based on the ratio of the number of transactions consummated to the number of visits to the merchant's online marketplace needed to generate such transactions. A merchant can use their conversion profile to evaluate the performance of the offer, and modify their offers dynamically. For example, if a particular offer is not being accepted by an adequate number of users, a merchant can increase the incentives being offered to attract more users.

Another aspect of the invention is to use a set-top box arrangement to provide the searching and profiling capabilities described above. In one embodiment, processing logic in a set-top box and/or remote control can track user behavior during television watching. This information can then be communicated to a viewer profile database, which may be maintained locally or remotely. This database can then be used to provide customized content, advertising and/or information to the viewer to enhance the viewing experience. In another embodiment, real-time commercial offers may be targeted to individual users based on the viewer profile information.

When implemented in software, the elements of the invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory or other non-volatile memory, a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Referring now to FIG. 1, system 100 includes client-side system 110 which may be used to receive broadcast content 140 and/or non-broadcast content 130. In one embodiment, broadcast content 140 includes television programming which is broadcast as radio frequency signals by one or more content providers, as well as streaming multimedia content. In another embodiment, or in addition to one or more of the previous embodiments, non-broadcast content 130 is content and/or data which is provided to the client-side system 110 over network 120. It should also be appreciated that the network 120 may be the Internet, or may also be a wide area network, a local area network or any other type of connection. It should also be appreciated that non-broadcast content/data 130 may include user-preference data, multimedia content and any other form of non-broadcast data.

As shown in the embodiment of FIG. 1A, client-side system 110 further includes processing logic 150, display device 160 and user input device 170. While in one embodiment processing logic 150 is a set-top box (STB) device, it should equally be appreciated that other connected devices with similar capabilities may be used to receive, decode and process both non-broadcast content/data 130 and broadcast content 140. In the embodiment, the client-side system 130 may simultaneously present both non-broadcast content 130 and broadcast content 140 to a viewer.

In addition to receiving and processing both non-broadcast content 130 and broadcast content 140, processing logic 150 may further provide information/data to and display device 160, as well as any number of systems connected to network 120. In another embodiment, processing logic 150 provides information back to a back-end system 180 via network 120. As will be discussed in more detail below, such information may relate to user viewing and/or content searching habits. In one embodiment, display device is used to render image/video for presentation to a viewer. While in one embodiment the display device 160 is a television, it may similarly comprise other broadcast-content-based display devices.

It should also be appreciated that processing logic 150 may further include recording functionality, such as the functionality provided by a digital video recorder (DVR). User input 170 may optionally be used to communicate with processing logic 150 and/or display device 160 for display control, channel selection, feature selection and the like. In one embodiment, user input device 170 is a remote-control-type device, although it may also be any other input means, such as a keyboard, voice recognition, touch screen, etc.

Back-end system 180 is shown as being in communication with client-side system 110 via network 120, as well as non-broadcast content 130. It should be appreciated that non-broadcast content 130 may be stored locally as part of back-end system 180, or alternatively may originate from a third-party location (e.g., third-party website). As will be described below, viewer actions may be monitored and reported to back-end system 180. In one embodiment, back-end system 180 is used to store one or more viewer databases which maintain individual viewer profiles. These viewer profiles may then be used to tailor specific content, of either the broadcast or non-broadcast variety, to particular viewers. In another embodiment, viewer profiles may be used to improve the effectiveness of direct marketed.

While non-broadcast content/data 130 may be provided by other processing logic devices coupled to network 120 according to the viewer profile information collected and maintained on back-end system 180, it may also come from a third-party online source (music database, movie trailer database, etc.). Moreover, non-broadcast content/data 130 may be provided to or from a back-end server 180 that is also coupled to network 120. In one embodiment, non-broadcast content 130 may include the data collected by processing logic 150 relating to viewer habits and other activities.

Figure 1B:
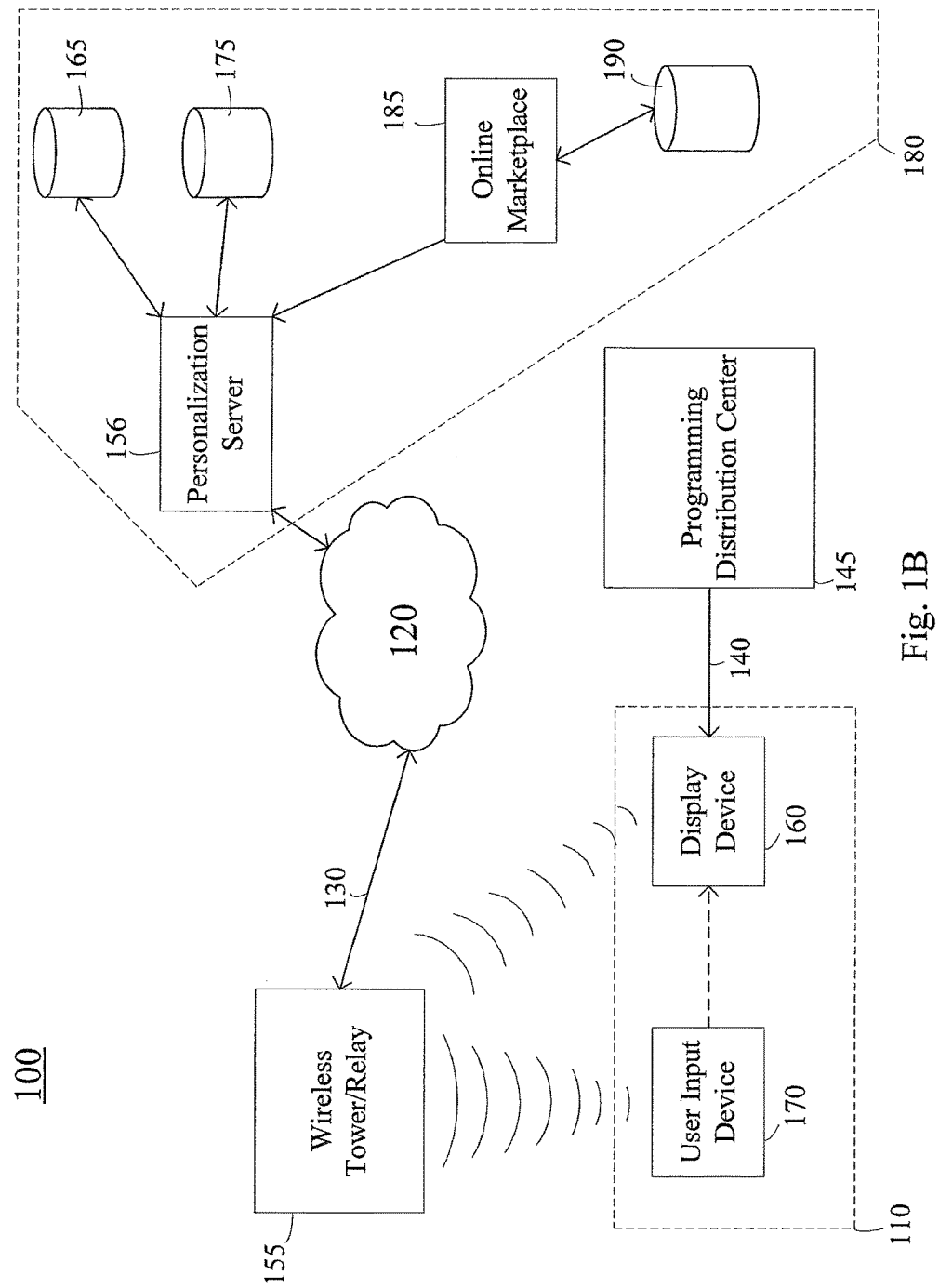

FIG. 1B depicts another embodiment of system 100 with a more detailed view of one embodiment of back-end system 180. In this embodiment, broadcast content 140 is provided to display device 160 by a programming distribution center 145 (e.g., network television station, etc.). In addition, non-broadcast content 130 may be relayed to the client-side system 110 by wireless tower/relay 155, and wireless tower/relay 155 may communicate wirelessly with the user input device 170. Alternatively, tower/relay 155 may communicate directly with display device 160, which in one embodiment comprises processing logic 150.

Continuing to refer to FIG. 1B, in one embodiment non-broadcast content relates to personalized advertising/commercial content, and back-end system 180 includes personalization server 155. User database 165 may be used to store user profile data derived explicitly and/or implicitly from user viewing and/or searching activities. In another embodiment, user database 165 may be part of client-side system 110.

Personalization server 155 may be used to track user activities, update user database 165, and access available advertising and related content from database 175. In one embodiment, merchants provide targeted advertisements from database 175 to personalization server 155 based on information in user database 165. For example, advertisements may be streamed to display device 160 in real-time and may include limited time offers. For example, a user may be given the opportunity to receive a discount on a targeted commercial item if purchased within the next 10, 20, 30 etc. minutes. As will described in more detail below with reference to FIG. 6, available merchant offers may be selected based on a keyword analysis of the current programming content.

Continuing to refer to FIG. 1B, back-end system 180 further includes online marketplace 185 which may be used to connect advertisers with customers. In one embodiment, online marketplace 185 may comprises one or more ad servers, as detailed in U.S. patent application Ser. No. 10/303,167, entitled "Online Media Exchange," which is hereby fully incorporated by reference. As detailed therein, advertisers may monitor user activities and create customized limited-time offers. Content and inventory database 190 may be used to populate the online marketplace 185 with available commercial items, as well as advertisements and offers for such items.

Irrespective of how advertising and merchant offers are established (e.g., using the online marketplace 185), personalization server 155 may also analyze programming content, using keywords for example, to determine which advertisement/offers to present to the viewer and when. As will be described in more detail below with reference to FIGS. 6 & 7, advertisements and/or offers may be directly associated with particular programming based on matching one or more keywords which are descriptive of such programming.

Figure 2:
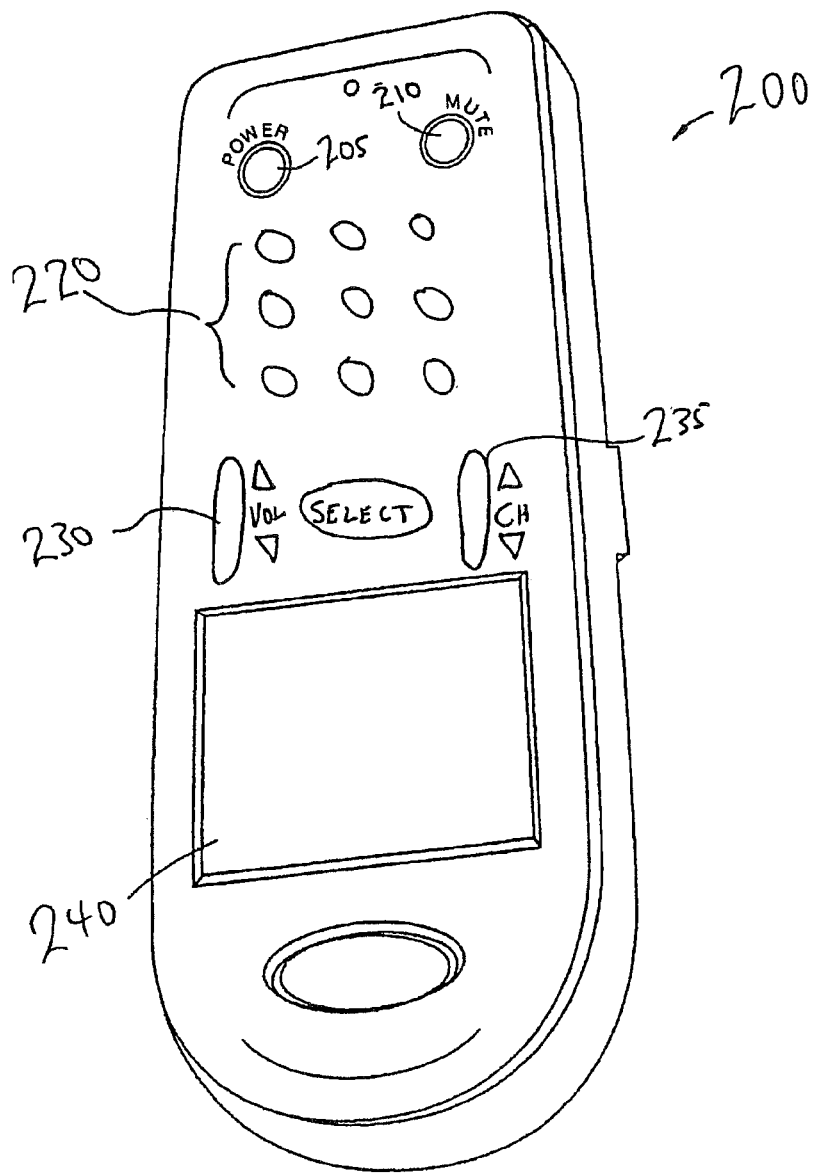
FIG. 2 depicts one embodiment of a viewer input device capable of carrying out one or more aspects of the invention.

One aspect of the invention is to provide a search-enabled remote control device which may be used to navigate through menus or selection options. In one embodiment, a traditional remote control interface (e.g., volume up, volume down, channel up, etc.) may be used to perform content searches and navigate search results. In another embodiment, search results may be displayed on a screen portion of the search-enabled remote control device. FIG. 2 depicts one embodiment of a search-enabled remote control consistent with the principles of the invention. In the embodiment of FIG. 2, remote control 200 includes power 205 and mute 210 buttons, volume 230 and channel 235 selection buttons and keypad 220. It should further be appreciated that remote control 200 may have numerous other configurations and still be consistent with the principles of the invention. For example, remote control may include a thumb board for entering text. Remote control 200 may further be adapted to include voice recognition and/or written character recognition.

In one embodiment, viewers may use one or more of the keypad 220, volume button 230, channel selection button 235 to enter content search parameters that are to be processed by processing logic 150, which in one embodiment is a set-top box. While in one embodiment, the search parameters may relate to available (or soon to be available) broadcast content 140, viewers may similarly search for available non-broadcast content 130 and/or information. As mentioned above, one aspect of the invention is to track viewers actions and to develop a viewer profile based on such actions, including the types of searches performed and/or programming viewed. Additional types of viewer actions which may be used to update the viewer's profile may also include switching to or away from particular types of programs, and switching to or away from particular types of commercials. Moreover, in the case of a DVR-enabled set-top box, the types of programming recorded may also be used to update the viewer's profile. In one embodiment, viewer profiles may then be used to tailor content and other information for a particular viewer. Such content may include advertisements, additional programming options and/or purchase options.

Continuing to refer to FIG. 2, remote 200 is also depicted with optional display screen 240. This enables search results to be presented to the viewer on the remote 200 itself. Alternatively, the search results may be displayed on display device 160. In another embodiment, display screen may be a touch screen which enables the viewer to navigate one or more selection menus relating to available broadcast content 140, available non-broadcast content 130 and/or search options and results.

As with described in more detail below with reference to FIG. 8, another aspect of remote 200 is to prioritize search results based on one or more factors. In one embodiment, search results may be tailored to a viewer based on the viewer's profile, which in one embodiment is reflective of the viewer's interests. In another embodiment, search results may be prioritized based on a merchant/advertiser ranking. While merchants/advertisers may be ranked according to numerous criteria, in one embodiment the ranking process is based on the bidding process described in U.S. Pat. No. 6,269,361, entitled "System and Method for Influencing a Position on a Search Result List Generated by a Computer Network Search Engine," which is hereby fully incorporated by reference. In addition to the bidding process described therein, advertisers/merchants may be ranked (and hence search results prioritized), based on pre-purchased advertising preference, as well as a combination of user profiling and merchant/advertiser ranking.

Figure 3:
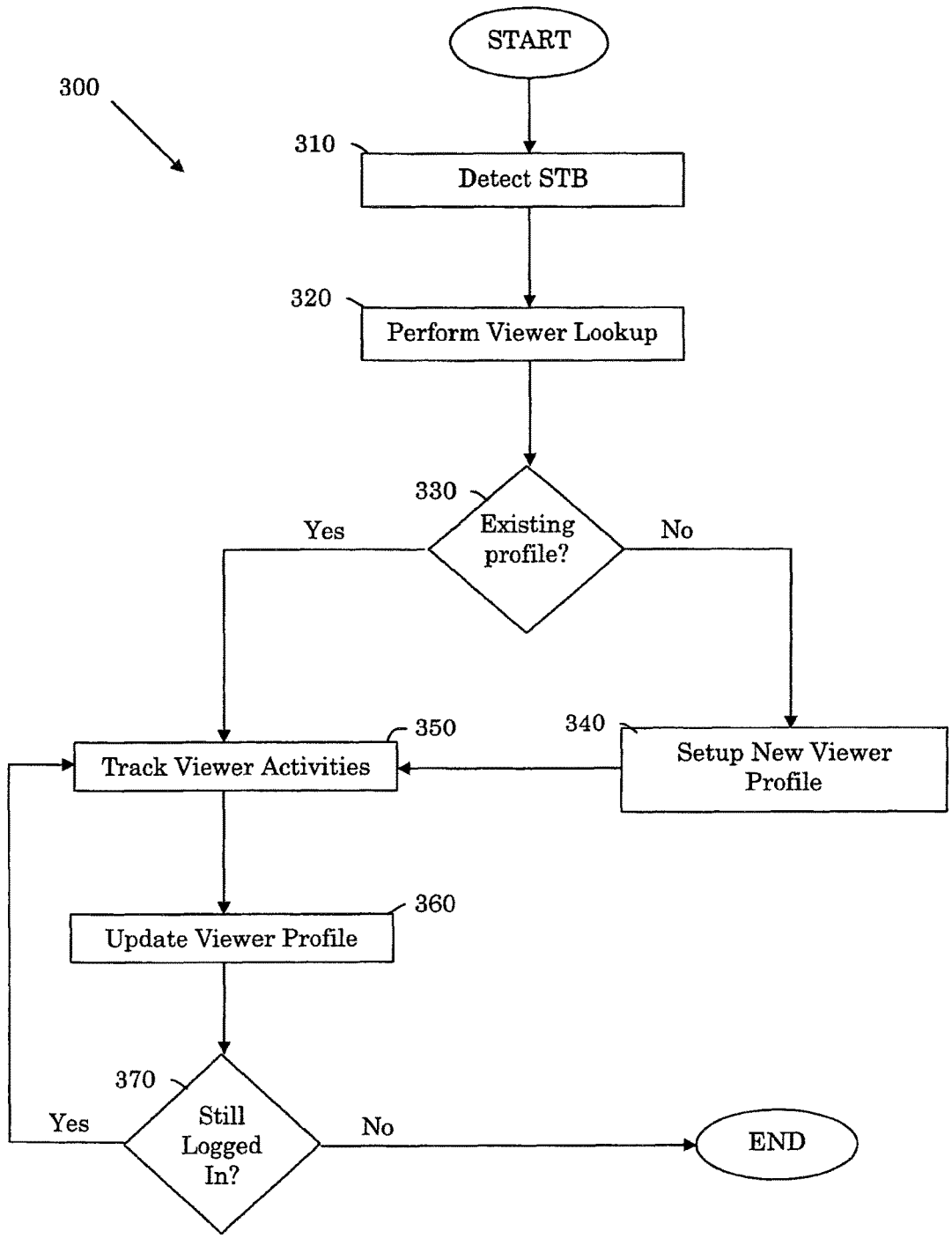
FIG. 3 is a flow diagram of how a viewer profile may be setup and/or maintained, according to one embodiment.

FIG. 3 depicts a simplified flow diagram for how a viewer's profile may be established and developed. In particular, in order to develop a viewer profile to be able to tailor future content and/or information, a viewer must be identified and their actions associated with a particular profile. In one embodiment, viewer profiles are maintained in one or more databases which form part of back-end system 180. In another embodiment, viewer profiles are maintained on the client-side, such as in client-side system 110.

In the embodiment of FIG. 3, the user profile is maintained on the server-side (e.g., in a back-end system 180 database). Process 300 begins at block 310 when a client device (e.g., set-top box, processing logic 150, etc.) is detected by back-end system 180. In one embodiment, the client device may be identified based on a device ID, such as an Ethernet Media Access Control (MAC) address. Additionally, the device ID may be a smart card address, wireless network address, CPU identifier, or simply an arbitrarily assigned value. The use of certificates, encryption, hashing, secure sockets, and so on may also be used to prevent tampering with the device identification. It should of course be understood that there are numerous methods for identifying a client device that are consistent with the principles of the invention.

Once the client device has been detected, a viewer profile associated with the particular client device may then be accessed at block 320. In one embodiment, a lookup table is used to access a database entry associated with the detected device ID. While in one embodiment, this database entry is maintained by back-end system 180, it may similarly be maintained by some other system coupled to network 120.

Block 330 involves a determination of whether or not there is an existing profile for the viewer in question. If this is a first-time viewer, a viewer profile may not yet be available. In that case, process 300 would continue to block 340 where the profile may be established. In one embodiment, a viewer may use the user input device 170, which in one embodiment is remote control 200, to enter various viewer-specific data. Alternatively, the viewer may establish a profile online by connecting to the back-end system 180 over the Internet. Similarly, the initial viewer profile may simply be automatically generated and later updated with information pertaining to the viewer's searching and/or viewing activities.

Whether or not a new profile has to be set up, once a viewer profile has been established and associated with the client device, process 300 may then continue to block 350. In one embodiment, viewer actions from this point forward may be tracked. Such viewer actions may include searches performed using search-enabled remote control 200, broadcast content viewed, non-broadcast content requested, content selected for recording, channel changing actions, advertisements viewed, commercial items purchased, etc. In fact, all viewer actions may similarly be tracked and/or recorded. For example, suppose a viewer tunes to Program A and thereafter increases the volume. Moreover, suppose then that the viewer decreases the volume (or presses mute) as soon as Commercial A airs. All of this information may be pertinent to determining the interests of the viewer and a means of developing a more accurate global viewer profile. As discussed above, a viewer's behavior while watching television may be tracked and a television viewing profile developed there from. In addition, the online behavior of this same viewer may also be tracked and used to supplement his/her television viewing profile.

As viewer actions are tracked, process 300 further includes updating the viewer's profile at block 360. In one embodiment, this may include transmitting the relevant data to back-end system 180 via network 120. In one embodiment, back-end system 180 may then update a profile database. The process of tracking user activities (block 350) and correspondingly updating the viewer's profile (block 360) may then continue until a determination is made that the client device is logged out (block 370). In one embodiment, a client device is only logged out upon powering down. It is to be appreciated that given the identity of the user (e.g., from the client device ID), the preferences and viewer profile as they apply to a viewer can now be directly applied to this same viewer on any other device that can be identified with the user. In this fashion, a viewer may transfer and/or maintain their viewer profile across devices and mediums, such as for example with Internet searching or online content surfing (e.g., Yahoo! Properties).

Figure 4:
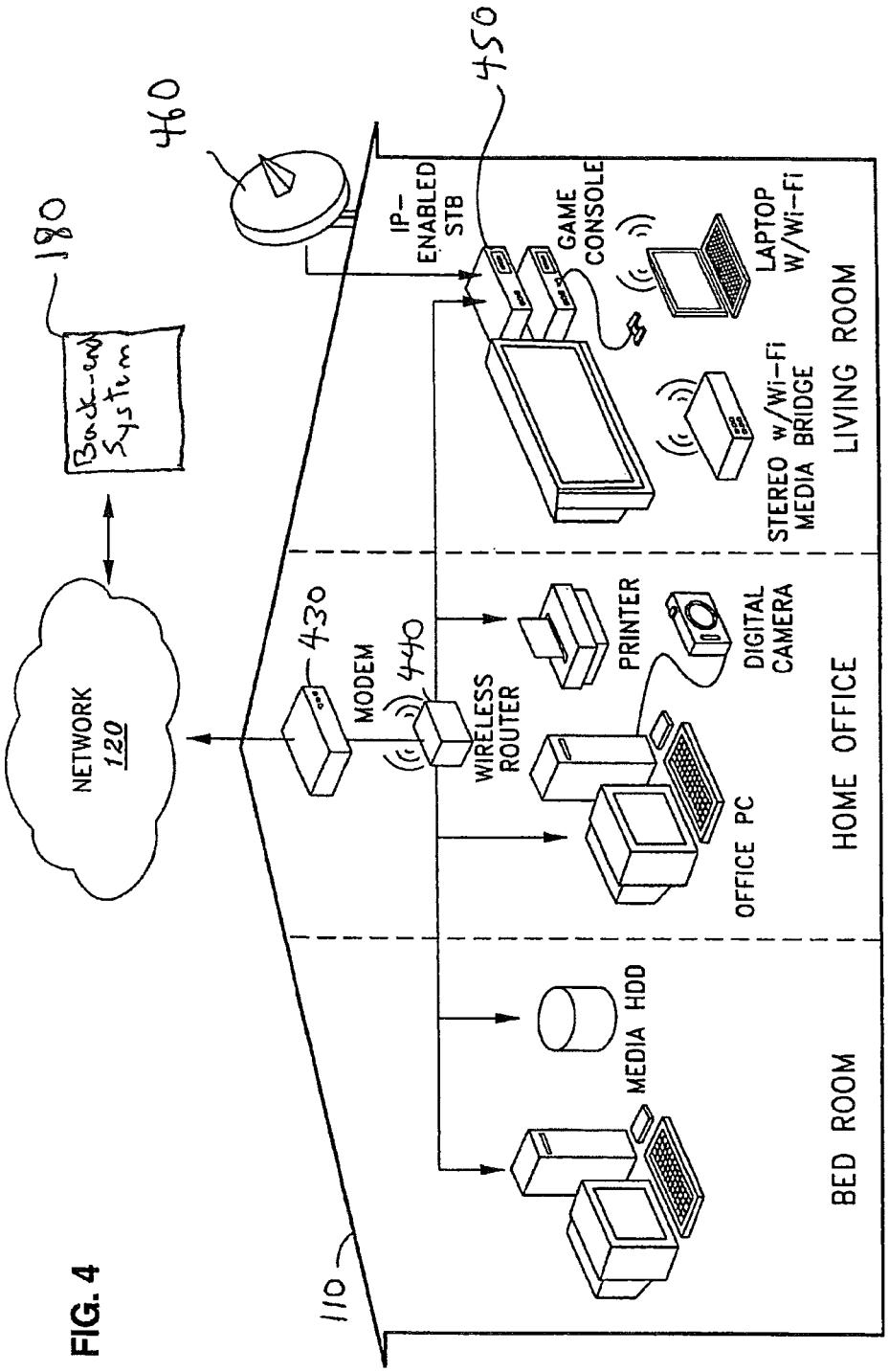
FIG. 4 depicts another embodiment of a system-level diagram of various aspects of the invention, showing the interconnectivity relating thereto.

FIG. 4 depicts one embodiment of system-level diagram showing the interconnectivity of various aspects of the invention. In this embodiment, back-end system 180 communicates with client-side system via network 120, which in one embodiment is the Internet. With back-end system 180 coupled to network 120, a user can access/request various data/services (e.g., via modem 430). In this embodiment, the client-side system 110 comprises a bedroom portion, a home office portion and a living room portion. In one embodiment, a wireless router 440 may be used to interconnect the various client-side systems.

Continuing to refer to FIG. 4, client-side system is shown as further including an IP-enabled STB 450, which in one embodiment performs the functions of previously-described processing logic 150. In one embodiment, STB 450 may communicate with back-end system 180 (which in FIG. 4 is comprised of storage 410 and server 410) via modem 430. Alternatively, STB 450 may communicate with the back-end system 180 via satellite link 460. In another embodiment, search-enabled remote control 200 may be used by a viewer to interact with STB 450 and to submit search queries as previously described. Alternatively, the remote control 200 may communicate wirelessly with the back-end system 180 directly. It should of course be appreciated that the particular devices depicted in FIG. 4 that comprise the client-side system 130 are illustrative only, and numerous other configuration are equally consistent with the principles of the invention.

Figure 5:
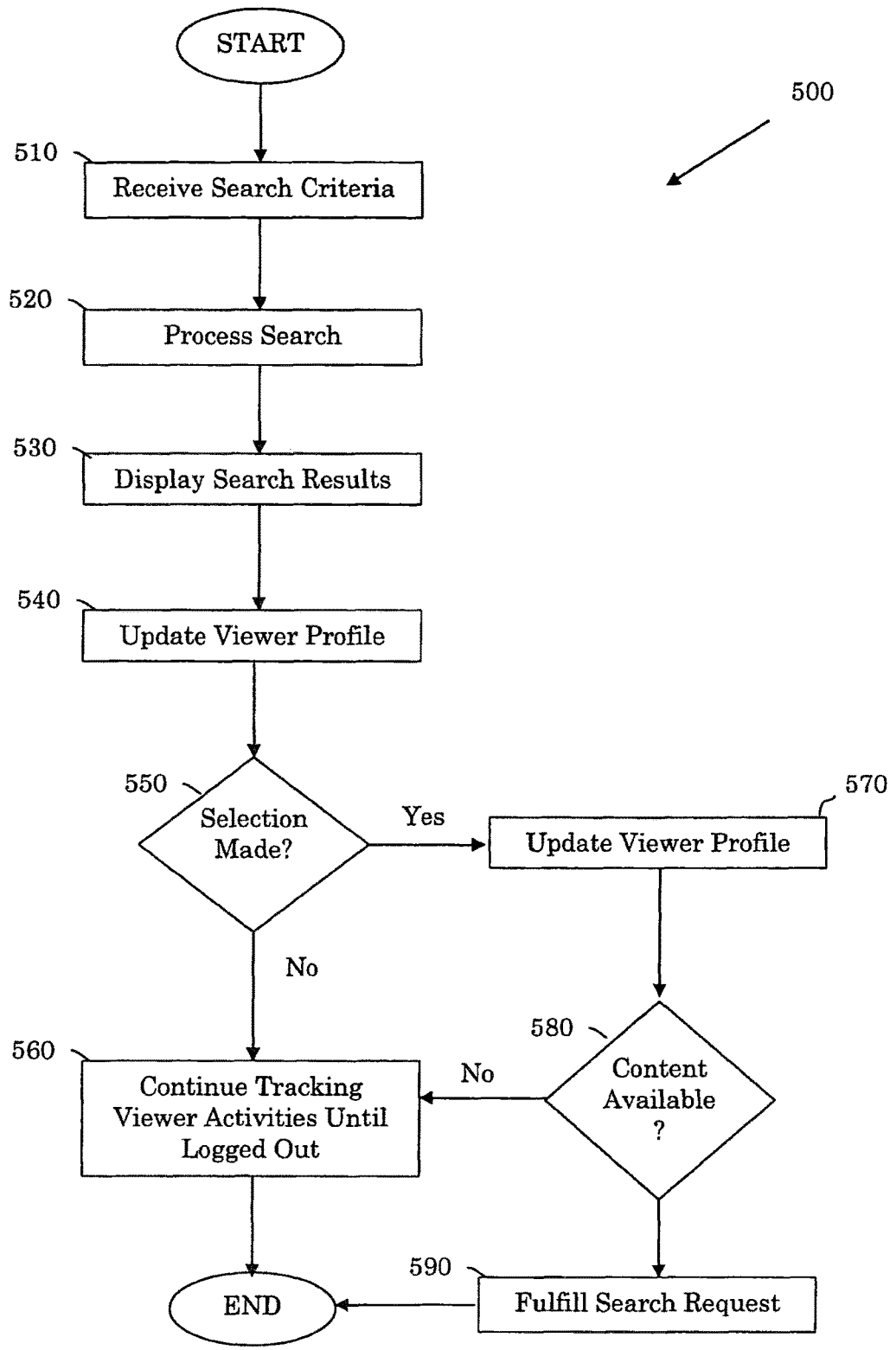
FIG. 5 is a flow diagram of how a viewer may perform content searches and the monitoring thereof, according to one embodiment.

As discussed above, one aspect of the invention is to track viewer activities and to update a viewer profile based on such recorded activities. To that end, FIG. 5 depicts one embodiment of a process 500 for using viewer search activities to maintain a viewer profile. The viewer profile may then be used to target advertisements, information and/or future programming options.

Process 500 begins with the system receiving a set of search criteria which has been entered by the viewer. In one embodiment, search criteria are entered using a search-enabled remote control, such as remote control 200. Regardless of the manner in which the search criteria are entered, process 500 may then process the search at block 520. In one embodiment, the search may be processed by a local set-top box (e.g., processing logic 150), or may be transmitted to the back-end system 180 for processing.

Once the search criteria have been processed, the results may be displayed at block 530. While in one embodiment, the results may be displayed on display device 160, the results may similarly be displayed on display screen 240 of remote control 200, as discussed above. As will be described in more detail below with reference to FIG. 8, search results may be prioritized and displayed according to a predetermined order. In one embodiment, search results are prioritized based on a bidding-type process, such as the process described in U.S. Pat. No. 6,269,361, which was previously incorporated by reference. In addition, advertisers/merchants may purchase ranking preference, possibly using tiered pricing arrangements. Finally, search results may similarly be prioritized based on the current user profile, or a combination of user profiling and merchant/advertiser ranking.

Regardless of how the search results are reported, the view profile may be updated at block 540, which in one embodiment involves transmitting the relevant search criteria/results data to back-end system 180 via network 120. Where only the search criteria and not the results are to be incorporated into the viewer profile, the profile may be similarly updated prior to displaying the results (block 530) and/or processing the search (block 520).

Continuing to refer to FIG. 5, once the search has been processed and the results displayed, process 500 may continue to decision block 550 where a determination is made as to whether the viewer has made a selection from the search results. If not, process 500 may continue to track the viewer's activities at block 560, as described above with reference to FIG. 3. If, on the other hand, a viewer does make a selection from among the search results, then this information may also be used to update the viewer's profile (block 570).

A determination may then be made as to whether the requested content/information is available. While in one embodiment, content may be made available by one or more providers of broadcast content 140, in another embodiment the requested content/information may be provided as non-broadcast content 130, or from any other source coupled to network 120. Once the available content/information has been retrieved, it may then be provided to the viewer at block 590. In one embodiment, the request may be filled by presenting content and/or information on display device 160, on display screen 240 or by having the client-side system 110 store it locally.

Figure 6:
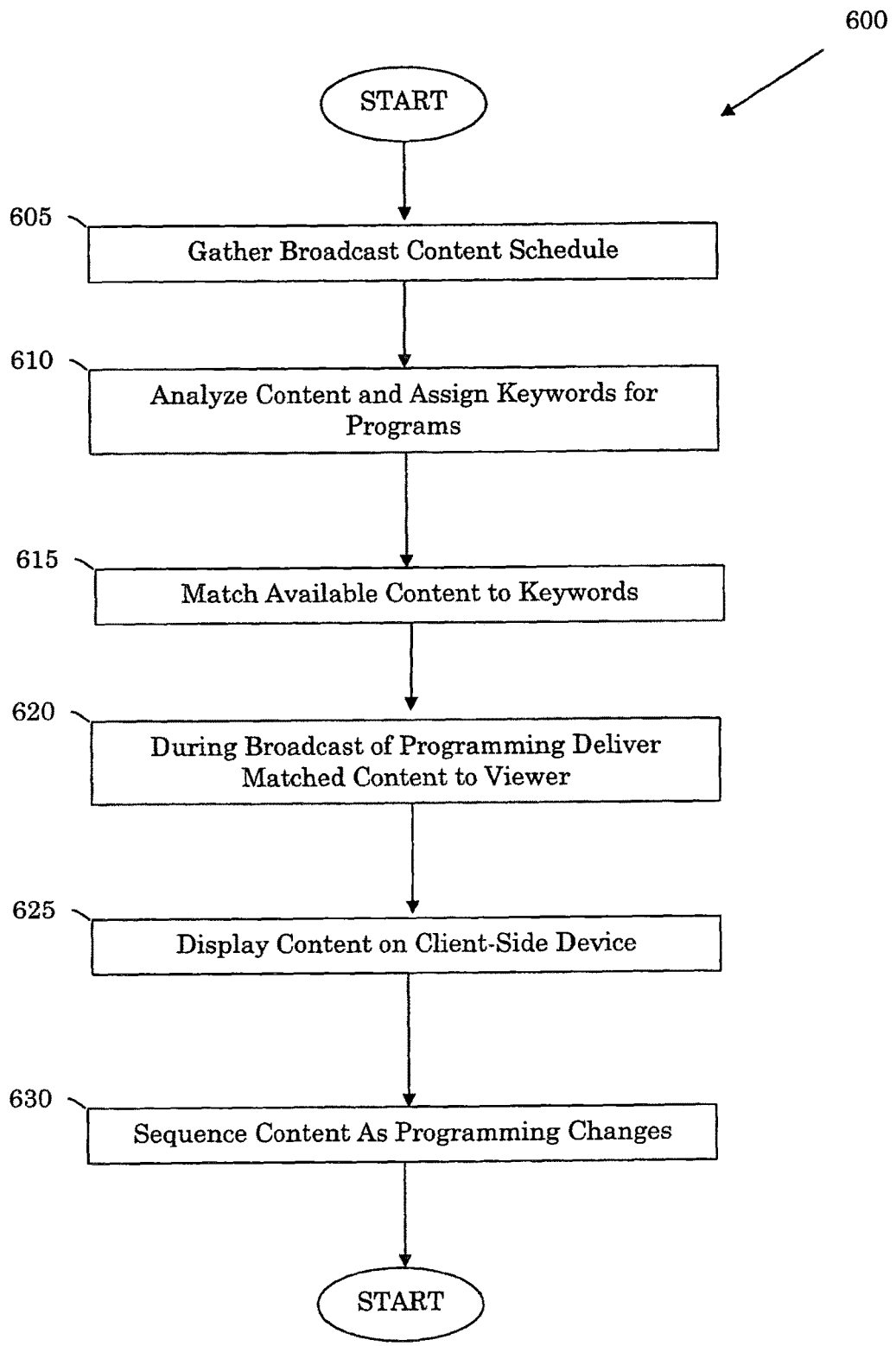
FIG. 6 is a flow diagram of one embodiment for serving personalized content to a television viewer.

Referring now to FIG. 6, depicted is one embodiment of a process 600 for serving personalized content (e.g., advertisements, offers, future programming options, online content, etc.) to a user. Process 600 begins at block 605 with the gathering of the broadcast content schedule, which in one embodiment may be done using personalization server 155. In any event, the broadcast content schedule information may be obtained from television programming guide data. At block 610, the broadcast content collected may be analyzed and assigned one or more keywords. In addition, keyword assignment may also be done for portions of a program or particular scenes of a program. For example, the keyword automobile may be associated with a chase scene of an action movie. In one embodiment, this keyword and/or temporal information may be stored in database 175.

Once the content analysis and keyword assignment tasks are completed, process 600 continues to block 615 where available content (e.g., merchant advertisements and/or offers, available online content, etc.) are matched to the assigned keywords. It should be appreciated there are numerous criteria that may be used to establish where or not there is a keyword match for a given advertisement and/or offer. For example, in one embodiment a match may only be found where a program has been assigned X keywords which match to a given merchant offer. If a program only contains X-1 matching keywords, the merchant offer will not be presented to the viewer.

Process 600 continues to block 620 where actual matching content may be delivered to the viewer, which in one embodiment comprises delivering the matching content to the client-side system 110 via network 120. At block 625, the matching advertisements/offers may then be shown on display device 160 of client-side system 110 as non-broadcast content 130, while at the same time broadcast content 140 is being displayed on display device 160. At this point, the viewer is free to navigate through the available matching content using, for example, remote control 200. In another embodiment, matching content may be displayed on a display portion of a user input device, such as remote control 200.

Continuing to refer to FIG. 6, process 600 continues to block 630 where offers may be updated and sequenced as the broadcast programming being viewed changes. In one embodiment, this is accomplished by continually polling the programming keywords and checking for matching content. As the programming changes, so too may the matching content. While in one embodiment, new content is displayed simultaneously with old content, in another embodiment new content may replace old content as the programming changes. Alternatively, viewers may be provided with a matching content submenu to access older matching content which is no longer being displayed and which have not yet expired.

Figure 7:
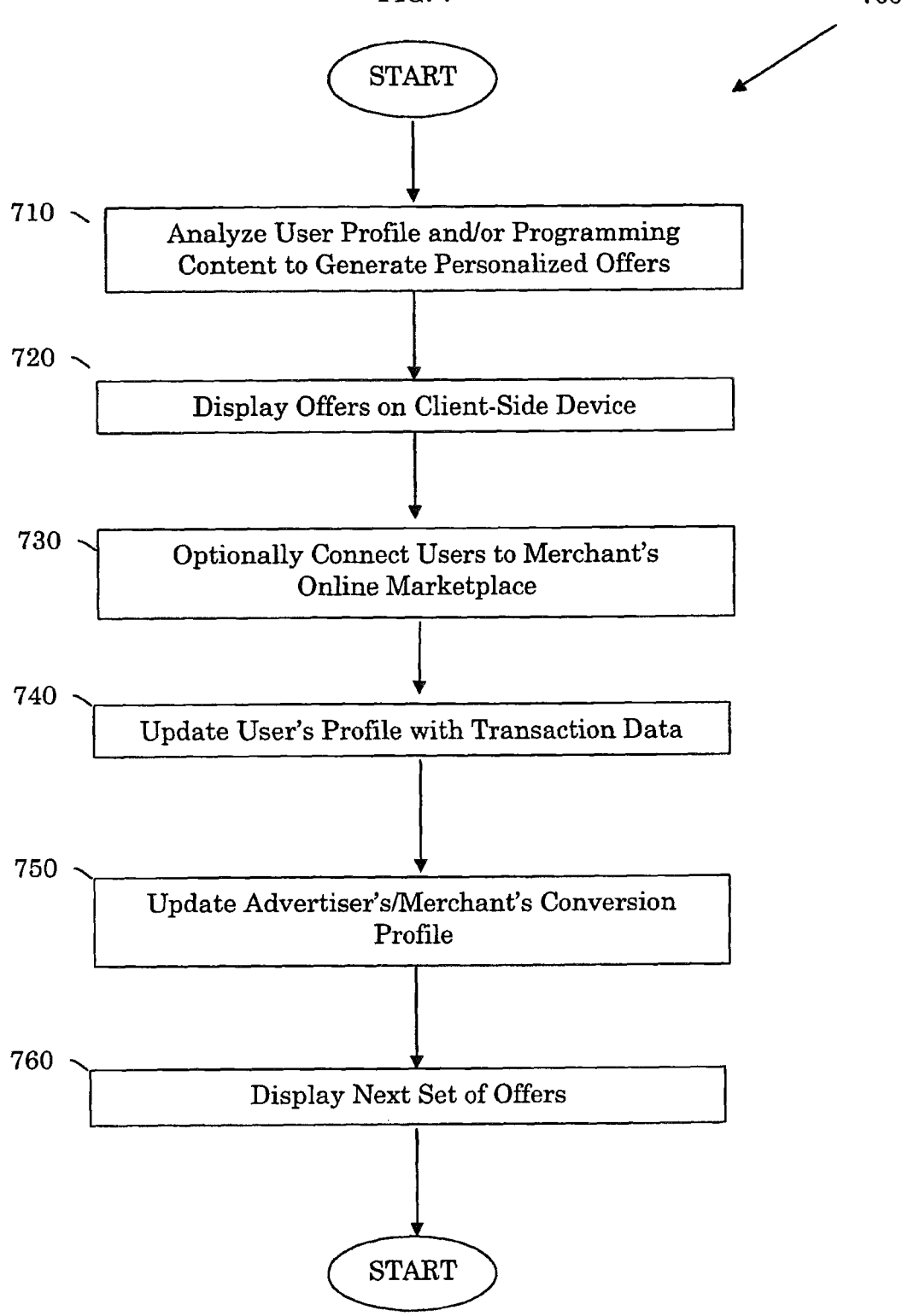
FIG. 7 is a flow diagram of one embodiment for facilitating personalized offers through an interactive device.

FIG. 7 depicts one embodiment of a process 700 for facilitating personalized offers through an interactive device, such as client-side system 110. In the embodiment of FIG. 7, process 700 begins with the analysis of one or both of a user's profile and programming content viewed. While in one embodiment the user's profile may be stored on user database 165, in another embodiment the user profile may be maintained locally, such as by client-side system 110. In the event that programming content is also to be analyzed in conjunction with the user profile data, such analysis may be done by keyword matching, as previously described with reference to FIG. 6.

At block 720, any identified personalized offers may be presented to the user, which in one embodiment means the offer is displayed on a display device (e.g., display device 160). If a user sees an offer of interest, they may opt to receive more information by selecting the offer using, for example, remote control 200. Rather than desiring to receive more information, a user may simply want to accept a personalized offer and consummate a transaction with a particular merchant. If a user has indicated that they would like to receive, or that they would like to purchase the offered item, process 700 would then continue to block 730 where the user may be optionally connected to the merchant's online marketplace 185, if available. In one embodiment, this includes connecting the user to a website of the merchant via network 120.

It should further be appreciated that the personalized offers may be time-based offers which, if not acted on, expire at a predetermined point in time. While in one embodiment, time-based offers may be commercial offers inviting the viewer to purchase goods or services at a special rate for a limited time, it should of course be understood that the offers may be of a non-commercial nature as well. By way of providing a non-limiting example, such offers may invite a user to purchase goods or services at a discounted rate if a purchase is made within a specified time. Such offers may also be in form of receiving additional free goods and/or services if a purchase is made within the specified time.

Whether or not the user actually purchases anything from the merchant, process 700 continues to block 740 where the user's profile may be updated. If the user does make a purchase, then the user profile can be updated with the transaction details. If the user fails to consummate a transaction, this information can also be used to update the user's profile. In this manner, future offers may be further tailored to a user based, not only on their viewing/searching habits, but also on their history of acting on available offers. As previously mentioned, user profile information may be maintained remotely, such as by user database 165, or on the client-side.

Continuing to refer to FIG. 7, the merchant's conversion profile may also be updated at block 750. In one embodiment, a merchant's conversion profile is based on the ratio of the number of transactions consummated to the number of visits to the merchant's online marketplace needed to generate such transactions. The merchant can use their conversion profile to evaluate the performance of the offer. As described in the previously incorporated co-pending U.S. patent application Ser. No. 10/303,167, merchants can monitor and modify their offers dynamically. If their offer is not being accepted by an adequate number of users, a merchant can increase the incentives being offered to attract more users.

Process 700 continues to block 760 where the next set of offers may be displayed to the user. As previously described with reference to FIG. 6, offers may be sequenced as programming content changes. In addition, new offers may be displayed simultaneously with old offers, or they may replace older offers as the programming changes.

Figure 8:
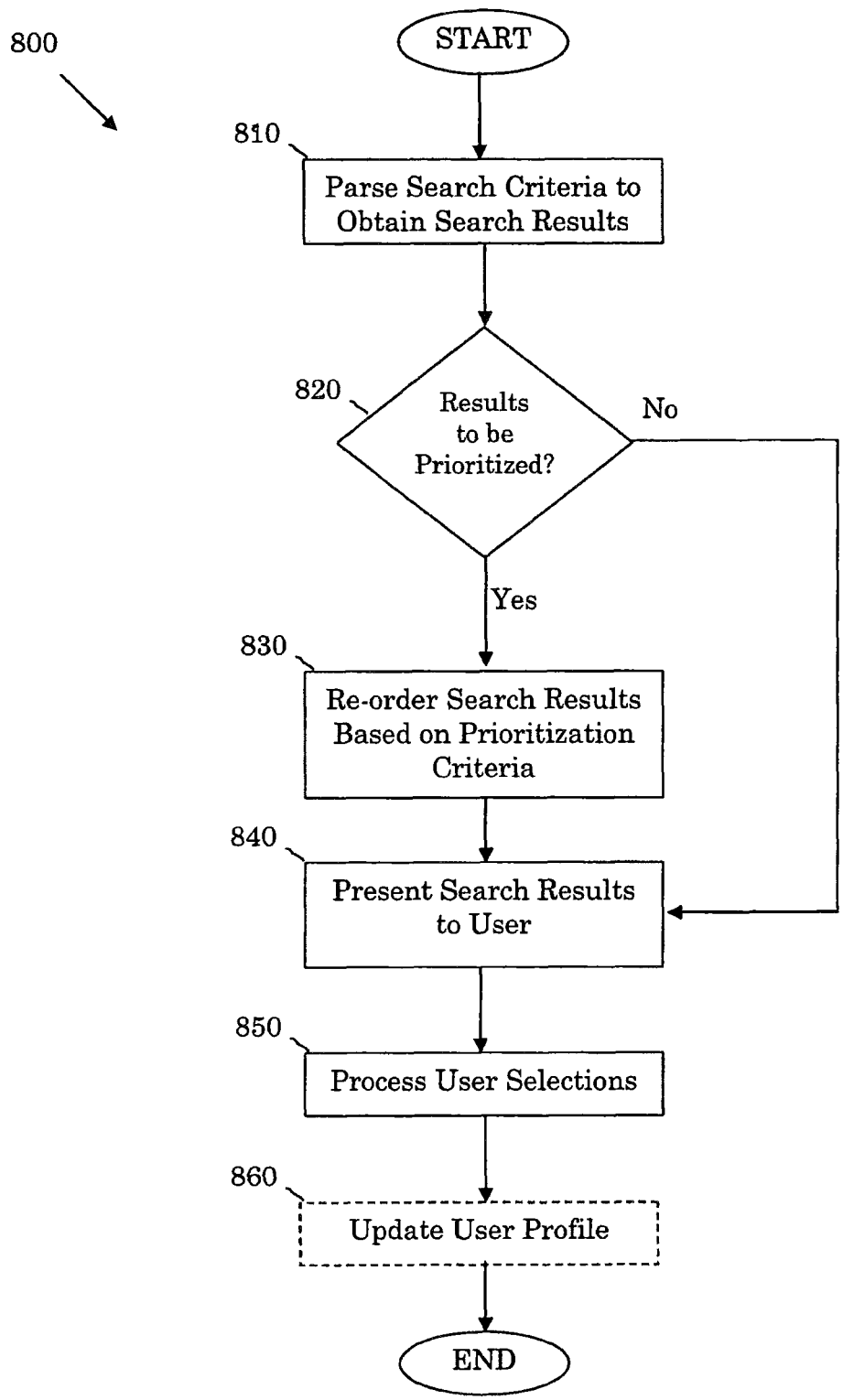
FIG. 8 is a flow diagram of one embodiment for prioritizing search results in accordance with the principles of the invention.

Referring now to FIG. 8, depicted is one embodiment of a process 800 for prioritizing search results based on one or more factors. As previously mentioned, one aspect of the invention is to tailor search results presented to a viewer based on one or more criteria, such as viewer profile data, merchant/advertiser rankings, sponsored results, or any combination thereof. While merchants/advertisers may be ranked according to numerous criteria, in one embodiment the ranking process is based on the bidding process described in the previously incorporated U.S. Pat. No. 6,269,361. In addition to the bidding process described therein, advertisers/merchants may be ranked (and hence search results prioritized), based on pre-purchased advertising preference.

Process 800 begins with the parsing of the search criteria at block 810. In one embodiment, the parsing is done by a back-end system (e.g., back-end system 180) coupled to a client-side system (e.g., system 110) via a network (e.g., network 120). In another embodiment, the search criteria may be parsed locally by the client-side system. The search criteria to be parsed may be user-provided via a client-side device or a user-input device (e.g., search-enabled remote 200) in communication with a client-side device. In another embodiment, the search criteria may be provided online to a back-end system.

Rather than the search criteria being provided by a user directly, the search parameters may be based on user profile data, such as the viewer profile described above with reference to FIG. 3 and FIG. 5. For example, automatic searches may be performed (e.g., using a back-end system such as system 180), and the results periodically presented to the user on a client-side device. As the viewer profile is updated, so too would the search parameters, resulting in dynamic search results being continuously provided to the user. This approach for determining the search parameters may be used in a configuration where search results are automatically and/or periodically "pushed" to the client-side device. In another embodiment, a combination of viewer profile data and user-provided search criteria may be parsed together to produce a search result listing which is both responsive to the user request, as well as tailored for the specific user.

In addition, the search results may include relevant broadcast content, as well as non-broadcast content. For example, parsing a user search may involve identifying Web results (e.g., Web sites, downloadable content, etc.), as well as broadcast results (e.g., upcoming television shows, movies, etc.). In this fashion, a listing of all available multimedia content may be compiled into one convenient compilation.

Once the search results have been obtained, process 800 continues to block 820 where a determination is made as to whether the search results are to be mixed and/or prioritized. If so, then process 800 will continue to block 830 where the search results may be re-ordered based on one or more predetermined criteria. In one embodiment, search results may be mixed and/or prioritized based on user profile data, preferred advertiser/merchant rankings or a combination thereof While the software needed to perform the mixing and/or prioritization process may be executing on a back-end system and/or server-side system, it should equally be appreciated that the search results may be streamed to a client-side system (e.g., client-side system 110), and then prioritized locally. In either case, a global user profile may be used to tailor the search results list such that results more in line with known user preferences and/or interests appear first. In addition, sponsored results may also be moved up the results list.

Once the order of the search results has been determined, process 800 will continue to block 840 where the results are to be presented to the user. At this point, the results may be presented on a display device 160 or any client-side device capable of visually rendering the results. In another embodiment, results may be presented on a user input device, such as remote control 200. In addition, the search results may be presented simultaneously along side broadcast and/or other non-broadcast content. In this fashion, a user may freely watch broadcast programming content while viewing search results which may have been "pushed" to the user display device or initiated by the user. It should be appreciated that numerous on-screen configurations are possible for displaying the search results simultaneously with other content, broadcast or otherwise.

At this point, the user may scroll through and select from among the search results using, for example, user input device 170 or remote 200. Any such user selections may then be processed at block 850. In one embodiment, user selections may be processed by navigating the user to a Web site, in the case of a Web-based search result selection. Similarly, a tuner for a client-side device may be tuned to a broadcast programming source selected from the search results. Additionally, content-based search results may be downloaded and/or streamed to one or more client-side devices upon selection from the search results list. The functionality of responding to user selections may be provided by a client-side set-top box device. Any such user selections may optionally be used to update a profile maintained for the user at block 860. This process may parallel the process described above with reference to FIG. 5.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

The invention is claimed is:

1. A method comprising:
   retrieving, by a processor, a broadcast content schedule, the broadcast content schedule including a plurality of broadcast content items;
   assigning and storing, by the processor for each broadcast content item, keywords and temporal information associated with a plurality of portions of the broadcast content item;
   receiving, by the processor from a user client device, integration preferences on how online content is to be integrated with programming content;
   receiving, by the processor from a user client device, current programming content being viewed on a television display separate from the user client device;
   matching, by the processor, the current programming content to one of the plurality of broadcast content items;
   identifying, by the processor, a plurality of keywords based on the identified one of the plurality of broadcast content items and a current time;
   selecting, by the processor, an offer from among said plurality of possible offers based on viewer profile data, a match to the keyword and merchant advertisement ranking based on a pre-purchased advertisement preference;
   communicating, by the processor and in accordance with the integration preferences, said selected offer, as the online content, to the user client device for display in synchronization with broadcast data displayed on the television display;
   receiving, by the processor from the user client device, a user response to said selected offer; and
   updating, by the processor, the viewer profile data and a merchant conversion profile to incorporate data derived from said user response.

2. The method of claim 1, wherein the integration preferences on how the online content is to be integrated with the programming content further comprises preferences on how the integration is to be displayed.

3. The method of claim 2, wherein the television display is on one of a display device and the remote control device.

4. The method of claim 2, wherein the integration preferences further comprises dynamic display by refining the display based on user interaction with results and the programming content.

5. The method of claim 1, wherein the online content comprises search results.

6. The method of claim 5, wherein the search results comprise dynamic search results based on the viewer profile data being updated.

7. The method of claim 5, wherein the search results comprise search results parsed from a combination of the viewer profile data and user-provided search criteria.

8. A system comprising:
   a processor;
   a storage medium for tangibly storing thereon program logic for execution by the processor, the program logic comprising:
      retrieval logic executed by the processor for retrieving a broadcast content schedule, the broadcast content schedule including a plurality of broadcast content items;
      assigning logic executed by the processor for assigning and storing, for each broadcast content item, keywords and temporal information associated with a plurality of portions of the broadcast content item;
      preference receiving logic executed by the processor for receiving, from a user client device, integration preferences on how online content is to be integrated with programming content;
      programming content receiving logic executed by the processor for receiving, from a user client device, current programming content being viewed on a television display separate from the user client device;
      matching logic executed by the processor for matching the current programming content to one of the plurality of broadcast content items;
      identifying logic executed by the processor for identifying a plurality of keywords based on the identified one of the plurality of broadcast content items and a current time;
      selecting logic executed by the processor for selecting an offer from among said plurality of possible offers based on viewer profile data, a match to the keyword, and merchant advertisement ranking based on a pre-purchased advertisement preference;
      communicating logic executed by the processor and in accordance with the integration preferences for communicating said selected offer, as the online content, to the user client device for display in synchronization with broadcast data displayed on the television display;
      response receiving logic executed by the processor for receiving, from the user client device, a user response to said selected offer; and
      updating logic executed by the processor for updating the viewer profile data and a merchant conversion profile to incorporate data derived from said user response.

9. The system of claim 8, wherein the integration preferences on how the online content is to be integrated with the programming content further comprises preferences on how the integration is to be displayed.

10. The system of claim 9, wherein the display is on one of a display device and the remote control device.

11. The system of claim 9, wherein the integration preferences further comprises dynamic display by refining the display based on user interaction with results and the programming content.

12. The system of claim 8, wherein the online content comprises search results.

13. The system of claim 12, wherein the search results comprise dynamic search results based on the viewer profile data being updated.

14. The system of claim 12, wherein the search results comprise search results parsed from a combination of the viewer profile data and user-provided search criteria.

15. A non-transitory computer readable storage medium comprising computer program code for execution by a processor, the computer program code comprising instructions for:
- retrieving, by the processor, a broadcast content schedule, the broadcast content schedule including a plurality of broadcast content items;
- assigning and storing, by the processor for each broadcast content item, keywords and temporal information associated with portions of the broadcast content item;
- receiving, by the processor from a user client device, integration preferences on how online content is to be integrated with programming content;
- receiving, by the processor from a user client device, current programming content being viewed on a television display separate from the user client device;
- matching, by the processor, the current programming content to one of the plurality of broadcast content items;
- identifying, by the processor, a plurality of keywords based on the identified one of the plurality of broadcast content items and a current time;
- selecting, by the processor, an offer from among said plurality of possible offers based on viewer profile data, a match to the keyword, and merchant advertisement ranking based on a pre-purchased advertisement preference;
- communicating, by the processor and in accordance with the integration preferences, said selected offer, as the online content, to the user client device for display in synchronization with broadcast data displayed on the television display;
- receiving, by the processor from the user client device, a user response to said selected offer; and
- updating, by the processor, the viewer profile data and a merchant conversion profile to incorporate said user response.

16. The non-transitory computer readable storage medium of claim 15, wherein integration preferences on how the online content is to be integrated with the programming content further comprises preferences on how the integration is to be displayed.

17. The non-transitory computer readable storage medium of claim 16, wherein the television display is on one of a display device and the remote control device.

18. The non-transitory computer readable storage medium of claim 16, wherein the integration preferences further comprises dynamic display by refining the display based on user interaction with results and the programming content.

19. The non-transitory computer readable storage medium of claim 15, wherein the online content comprises search results.

20. The non-transitory computer readable storage medium of claim 19, wherein the search results comprise search results parsed from a combination of the viewer profile data and user-provided search criteria.

* * * * *